(12) United States Patent
Nagata

(10) Patent No.: US 7,070,451 B2  
(45) Date of Patent: Jul. 4, 2006

(54) CARD CONNECTOR

(75) Inventor: Takayuki Nagata, Higashiosaka (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 10/661,549

(22) Filed: Sep. 15, 2003

(65) Prior Publication Data

US 2004/0058585 A1    Mar. 25, 2004

(30) Foreign Application Priority Data

Sep. 25, 2002   (JP)   ............... 2002-278812

(51) Int. Cl.  
H01R 24/00   (2006.01)

(52) U.S. Cl. .................... 439/630; 439/159

(58) Field of Classification Search ............... 439/630, 439/153, 159, 377; 235/475  
See application file for complete search history.

(56) References Cited

U.S. PATENT DOCUMENTS 5,139,435 A * 8/1992 Komatsu et al. ............ 439/159  
5,286,207 A * 2/1994 McHugh ..................... 439/64  
5,299,946 A * 4/1994 Kusakabe ................... 439/159  
6,361,338 B1 * 3/2002 Chang ........................ 439/159  
6,655,973 B1 * 12/2003 Ji et al. ...................... 439/159  
6,729,892 B1 * 5/2004 Takada et al. ............. 439/159  
2003/0054694 A1 * 3/2003 Takamori et al. .......... 439/630

FOREIGN PATENT DOCUMENTS

JP   2533829   6/1996  
JP   3086612   4/2002

* cited by examiner

Primary Examiner—Michael C. Zarroli  
(74) Attorney, Agent, or Firm—Bacon & Thomas

(57) ABSTRACT

A card connector including a body made of an integral molded product of a synthetic resin, a head portion from which a pair of arms are extended, and a sheet metal frame. The arms have multipolar contacts. The sheet metal frame is stretched between the arms of the body, and cooperate with the body to form a card insertion space. The arms are prevented from being deformed, to adequately define the lateral width of a card insertion slot, whereby the operability of card insertion is maintained to a satisfactory level.

8 Claims, 5 Drawing Sheets

CARD CONNECTOR

BACKGROUND OF THE INVENTION

1. Field of the Invention

The present invention relates to a card connector, and more particularly to a card connector in which a card insertion space is formed by a body made of an integral molded product of a synthetic resin, and a sheet metal frame attached to the body.

In some of the card connectors of this kind, a body comprises a head portion having multipolar contacts, and a pair of right and left arms which are extended from the head portion, so that the right and left arms guide insertion of a card. In such a card connector, when the right and left arms are deformed to be displaced outwardly or inwardly from their original design positions, the operability of card insertion is impaired, or a card cannot be sometimes inserted. In the case where both the right and left arms are deformed to be inwardly displaced, particularly, the slot width (the lateral dimension of a card insertion slot) is excessively small even when one of the arms is displaced at a small degree, thereby impairing the operability of card insertion. In an extreme case, a card cannot be inserted into the connector. In the case where a thin body which has a small width and a thickness of only about several mm (2 to 3 mm) is requested to be produced by integral molding of a synthetic resin, the above situation is particularly remarkable because, for example, increases of the thickness and width of the arms are limited.

The specification of Japanese Patent No. 2,533,829 (FIGS. 4, 9, and 14) (hereinafter, referred to as "Patent literature 1") discloses a memory card connector. In the memory card connector, a reinforcement plate made of a sheet metal which cooperates with such a body to form a card insertion space is stretched between a pair of side guide arms (corresponding to the above-mentioned arms) of a connector housing made of a integral molded product of a synthetic resin. Retention tabs which are formed by bending right and left side edges of the reinforcement plate are inserted into slots (channels) which are formed in longitudinal middle portions of the side guide arms, respectively, thereby reinforcing the side guide arms. Patent literature 1 discloses also a structure in which a tang that is directly opposed to a grounding printed circuit for removing electrostatic charges from a main board is punched out in a tip end portion of the reinforcement plate, and a rectangular piece formed by a residual punching metal is inserted into a channel formed in the vicinity of the tip end of the corresponding side guide arm. In the memory card connector of Patent literature 1, recessed edges formed in a lower plate portion which is continuously integrated with the pair of side guide arms and a head portion have a rectangular shape.

The specification of Japanese Utility Model Registration No. 3,086,612 (hereinafter, referred to as "Patent literature 2") discloses an electronic card connector in which a reinforcement plate is extended between longitudinal middle portions of right and left side arms, the right and left side arms and the reinforcement plate are integrally molded by a synthetic resin, and the profile of the tip end edge of the reinforcement plate is formed into a recessed shape.

In the connector disclosed in Patent literature 1, the right and left retention tabs of the reinforcement plate are simply inserted into the slots configured by channels formed in the respective longitudinal middle portions of the pair of side guide arms. Although each of the side guide arms can be prevented from being deformed in a range between the inserted portion and the basal portion of the side guide arm, therefore, a portion which is closer to the tip end than the inserted portion serving as a portion for forming a card insertion slot cannot be effectively prevented from being deformed. In the case where the thickness and width of the side guide arms are reduced so as to thin and narrow the connector housing, the card insertion slot is excessively narrowed by deformations, particularly, inward deformations of the side guide arms, and the possibility that the operability of card insertion is impaired is increased. In order to form the slots into which the retention tabs of the reinforcement plate are to be inserted, the reduction of the widths of the side guide arms is limited. In the case where the connector housing is requested to be further narrowed and thinned, therefore, even the slots into which the retention tabs are to be inserted cannot be formed in the side guide arms. Consequently, the technique disclosed in Patent literature 1 in which the side guide arms are reinforced by inserting the retention tabs of the reinforcement plate into the slots formed in the side guide arms has a difficulty in promoting narrowing and thinning of the connector housing. Patent literature 1 discloses also the structure in which the rectangular piece in the tip end portion of the reinforcement plate is inserted into the channel formed in the vicinity of the tip end of the corresponding side guide arm. Although the structure can prevent each of the side guide arms from being deformed in a range between a vicinity of the tip end of the side guide arm and the inserted portion, the foremost end portion of the side guide arm cannot be prevented from being deformed. Since the channel for inserting the rectangular piece must be formed in the side guide arm, moreover, the above-discussed difficulty in promoting narrowing and thinning of the connector housing cannot be solved.

By contrast, Patent literature 2 simply discloses the technique in which, in the case where the reinforcement plate and the right and left side arms are integrally molded by a synthetic resin, even when the reinforcement plate is warped and the lateral middle portion of the card insertion slot is narrowed, a card inserted into the card insertion slot gradually pushes the lateral middle portion of the reinforcement plate, and the card is enabled to be inserted. The technique cannot solve the problem in that the right and left side arms are inwardly deformed to excessively narrow the card insertion slot.

As described above, Patent literature 1 discloses only the technique in which the right and left side guide arms are reinforced by using the reinforcement plate, and the reinforcement plate disclosed in Patent literature 2 simply provides the technique of reinforcing the right and left side arms. These literatures fail to provide a technique in which right and left arms are prevented from being deformed in an ensured manner based on the design, thereby improving the operability of card insertion and enabling a card connector to be easily narrowed and thinned.

The invention was developed in view of the above-mentioned circumstances. It has been found that a phenomenon in which right and left arms are deformed to be inwardly displaced from their original design positions because of a problem of the molding technique does not occur in the case where a body is provided with a lower plate portion which is extended between the right and left arms, a recessed portion that is recessed toward such a head portion is formed in the lower plate portion, and right and left recessed edges of the recessed portion are formed into an arcuate shape to enhance the breakage resistance. It is an object of the invention to provide a card connector in which a structure for preventing a pair of right and left arms from being deformed without forming a slot in the arms as disclosed in Patent literature 1 and properly positioning the arms to their original design positions is produced, so that, even when the card connector is further narrowed and thinned, the lateral width of a card insertion slot which is formed between the foremost ends of the right and left arms is adequately defined and the operability of card insertion is maintained to a satisfactory level.

It is another object of the invention to provide a card connector in which right and left arms are prevented from being inwardly deflected, whereby card insertion can be prevented from being impaired in operability or disabled.

It is a further object of the invention to provide a card connector in which a sheet metal frame that cooperates with a body having arms to form a card insertion space is used so as to eliminate causes of impairing the operability of card insertion by deforming the arms, without increasing the number of parts.

It is a still further object of the invention to provide a card connector of excellent durability in which, even when the card connector is narrowed and thinned by reducing the thickness and width of each of right and left arms, the arms can be provided with sufficient strength without increasing the number of parts.

SUMMARY OF THE INVENTION

In the card connector of the invention, a sheet metal frame cooperates with a body to form a card insertion space, the body being made of an integral molded product of a synthetic resin in which a pair of arms are extended from a head portion having multipolar contacts, the frame being placed between the arms. In the card connector, terminals of a card inserted into the card insertion space are respectively in contact with the multipolar contacts of the head portion, thereby electrically connecting them together.

In the invention, the frame comprises arm supporting means for blocking inward deflections of foremost end portions of the arms. According to the configuration, the arm supporting means of the frame blocks inward deflections of the foremost end portions of the arms, and hence each of the arms is prevented from being deformed in the whole length from the basal portion of the arm to the foremost end. Therefore, a phenomenon in which the card insertion slot and the card insertion space that are formed between the foremost end portions of the right and left arms are excessively narrowed to impair the operability of card insertion or disable a card to be inserted does not occur. Also reduction of the operability of card insertion due to deformations of the arms can be surely prevented from occurring.

In the invention, preferably, the arm supporting means is configured by a receiving piece which is to butt against an inward engagement face that is provided in a foremost end portion of one of the arms, and the receiving piece is formed by bending the frame. According to the configuration, the receiving piece of the frame butts against the inward engagement face in the foremost end portion of the arm, whereby inward deformation of the arm is blocked. Therefore, slots (channels), which are disclosed in Patent literature 1 are not required to be formed in the arm. As a result, the thickness and width of the arm can be easily reduced, so that the body can be further narrowed and thinned.

In the invention, preferably, the arm supporting means is configured by a pair of receiving pieces which are to butt against inward engagement faces that are provided in foremost end portions of the pair of arms, respectively, and the receiving pieces are formed by bending the frame. According to the configuration, inward deformations of the pair of right and left arms are blocked. Therefore, narrowing and thinning of the body having the structure in which the pair of right and left arms are extended from the head portion can be easily promoted.

In the invention, preferably, the body is provided with a lower plate portion which is continuously integrated with the head portion and the pair of arms, the card insertion space being formed between the lower plate portion and the frame, a recessed portion that is recessed toward the head portion is formed in the lower plate portion and between the pair of arms, and right and left recessed edges of the recessed portion are formed into an arcuate shape. According to the configuration, insertion of a card is guided by the frame and the lower plate portion of the body, so that the operability of card insertion is improved. Even when the lower plate portion having the recessed portion is thinned so as to further reduce the thickness of the card connector, recessed corners of the lower plate portion are hardly broken because the recessed edges of the recessed portion are formed into an arcuate shape. As compared with the case where the recessed edges of the recessed portion are formed into a perpendicular shape, moreover, the lower plate portion exerts more satisfactorily the function of preventing the basal portions of the right and left arms from being deformed.

In the invention, preferably, the pair of receiving pieces are extended in a thickness direction of a card which is to be inserted into the card insertion space, and a lateral width of an insertion slot of the card insertion space is defined by a distance between opposing inward faces of the receiving pieces. According to the configuration, the lateral width of the insertion slot of the card insertion space can be accurately defined, and hence the operability of card insertion is stabilized.

In the invention, preferably, plate-like pieces which overlap outward faces of the pair of arms to reinforce the arms respectively are formed by bending the frame. Preferably, the frame has a face plate portion which is extended from the head portion of the body to the foremost end portions of the arms, and positions of the foremost end portions of the arms where the engagement faces are formed are clamped between the plate-like pieces and the receiving pieces, respectively. According to the configuration, a structure is produced in which the arms are reinforced by the plate-like pieces of the frame and each of the arms is laterally clamped between the corresponding receiving piece and plate-like piece of the frame. Even when the card connector is narrowed and thinned by reducing the thickness and width of the arms, therefore, the arms are surely provided with sufficient strength.

As described above, according to the invention, although slots which are disclosed in Patent literature 1 are not formed in the arms, the arms can be prevented from being deformed, and properly positioned to their original design positions. Even when the card connector is further narrowed and thinned by reducing the thickness and width of the arms, therefore, the lateral width of the card insertion slot which is formed between the foremost ends of the right and left arms is adequately defined and the operability of card insertion is satisfactorily maintained. Particularly, the invention can achieve the remarkable effect that the sheet metal frame that cooperates with the body having the arms to form the card insertion space is used so as to eliminate causes of impairing the operability of card insertion by deforming the arms, without increasing the number of parts. Moreover, even when the card connector is narrowed and thinned, the arms of the body can be provided with sufficient strength without increasing the number of parts, and hence a card

DETAILED DESCRIPTION OF THE PREFERRED EMBODIMENT

Figure 1:
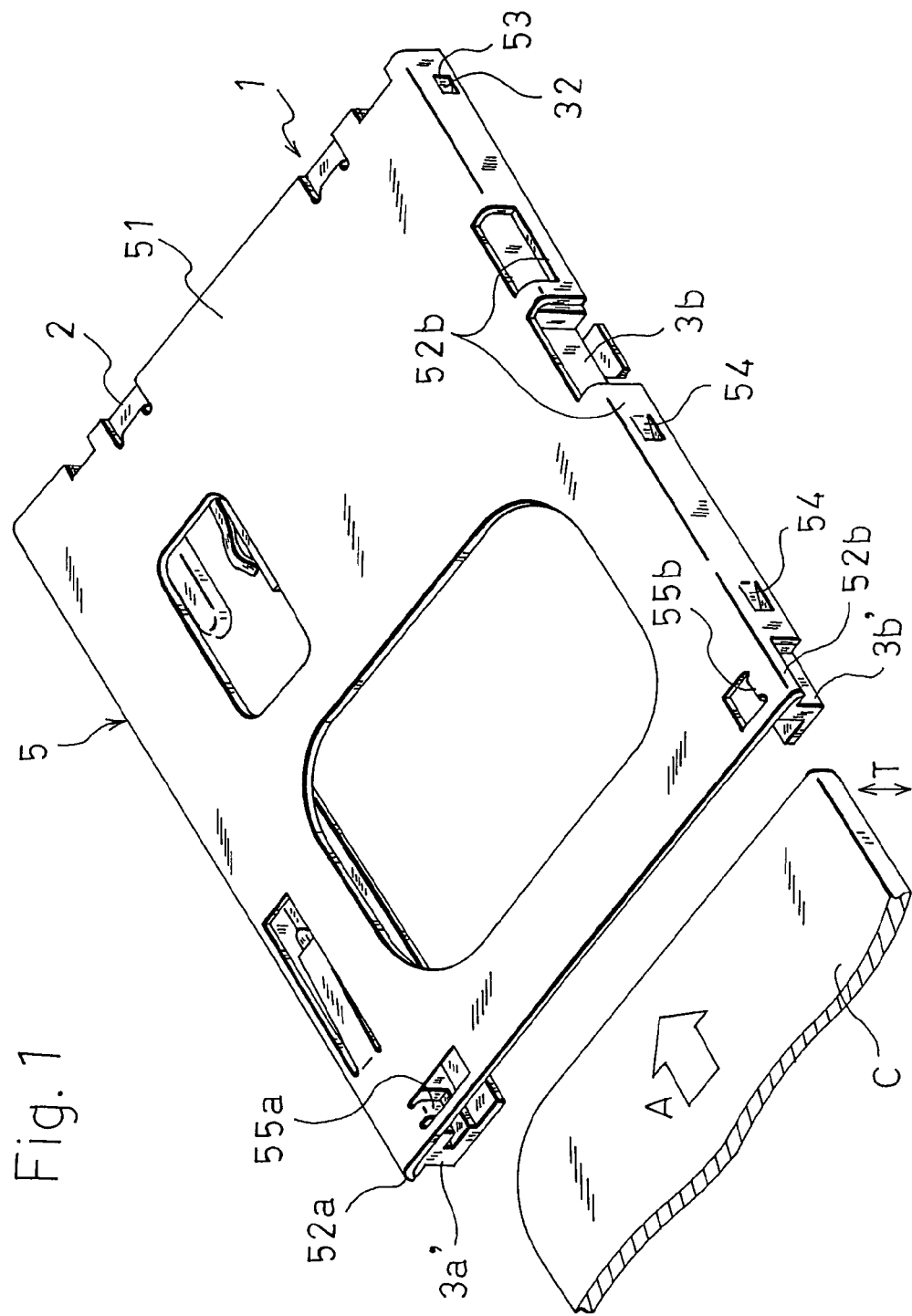
FIG. 1 is an external perspective view of a card connector which is an embodiment of the invention.
Figure 2:
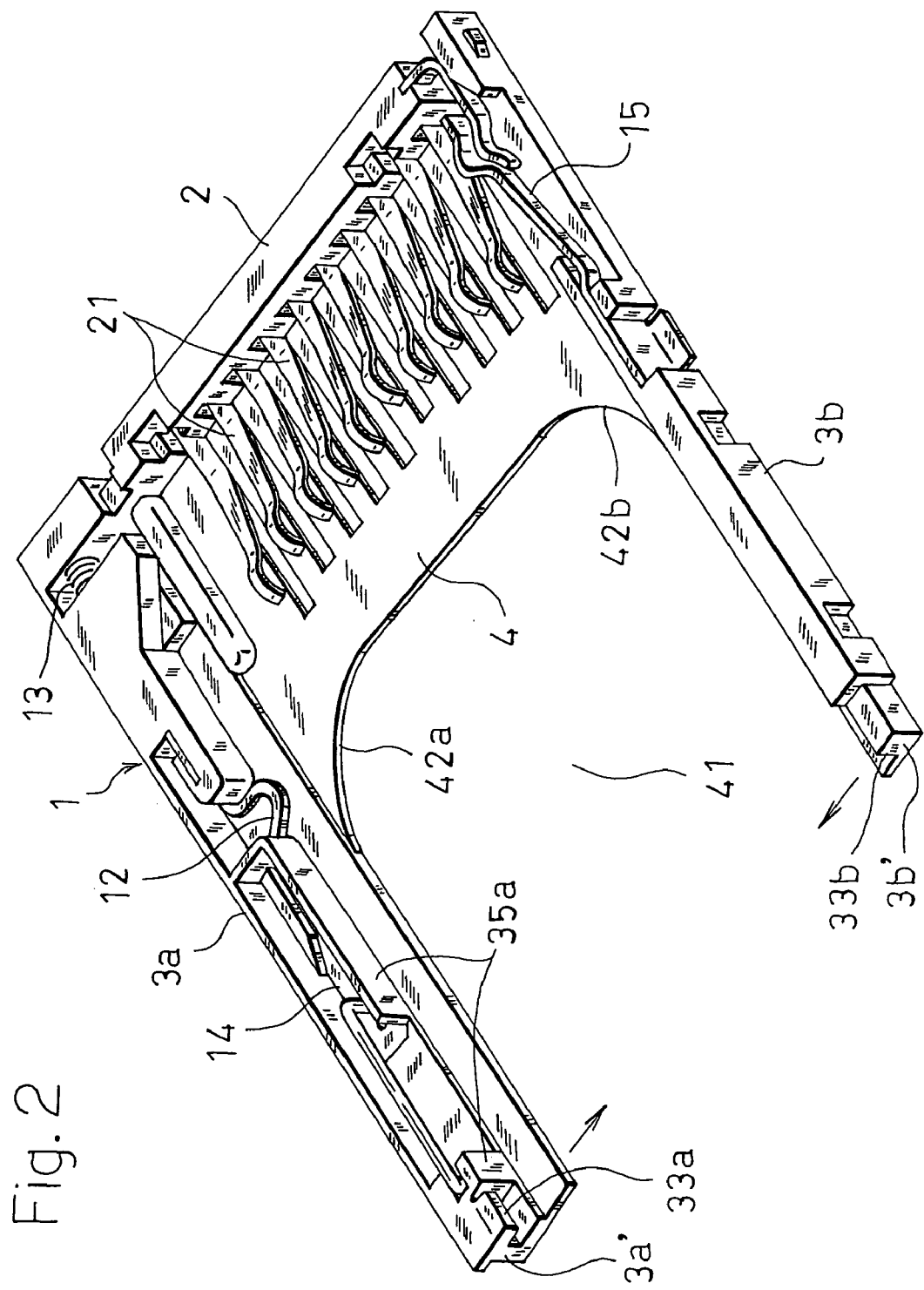
FIG. 2 is an external perspective view of a body.
Figure 3:
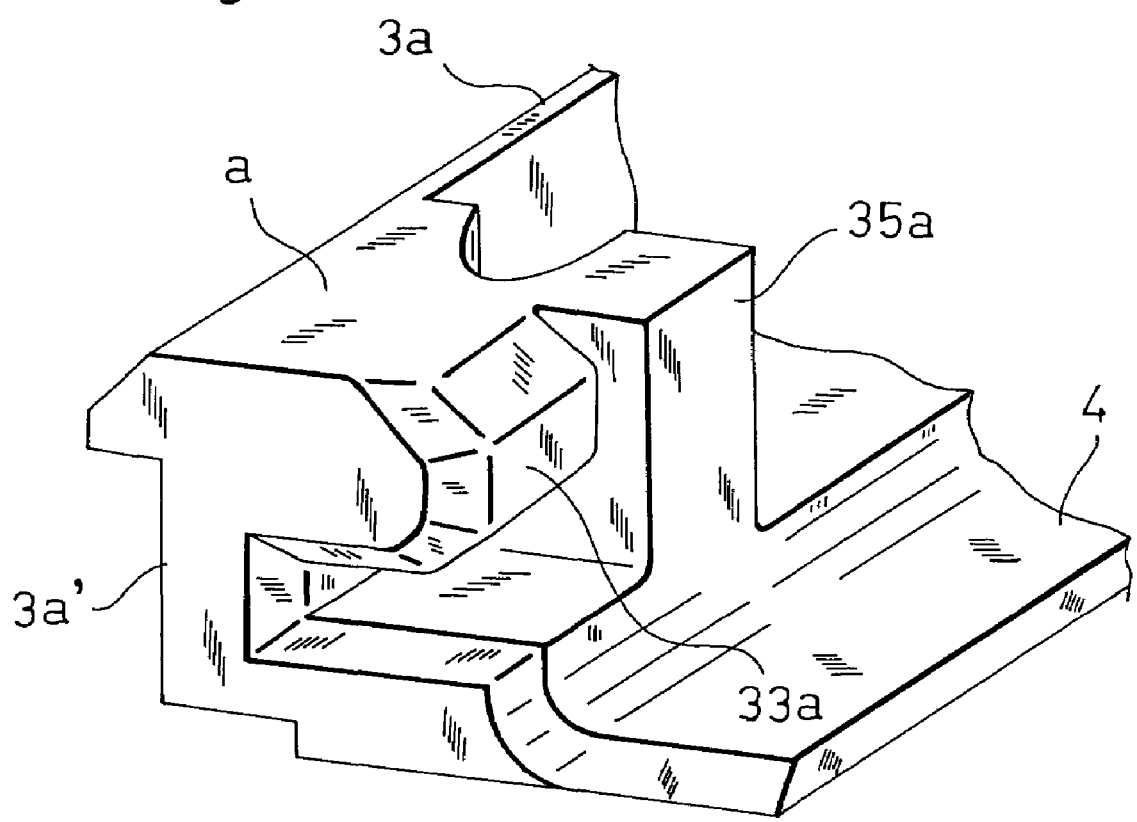
FIG. 3 is an enlarged perspective view showing a foremost end portion of a left arm of the body.
Figure 4:
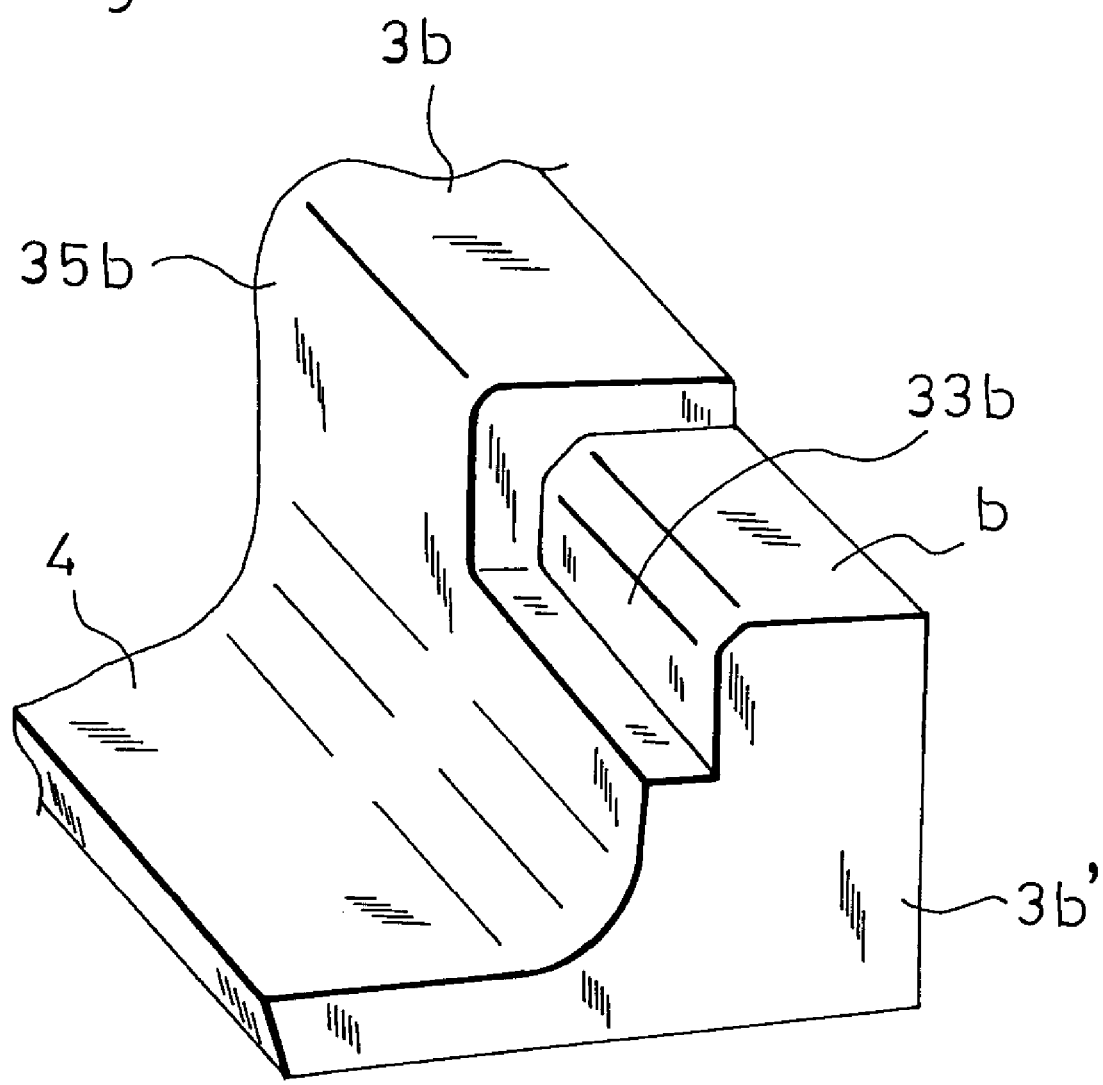
FIG. 4 is an enlarged perspective view showing a foremost end portion of a right arm of the body.
Figure 5:
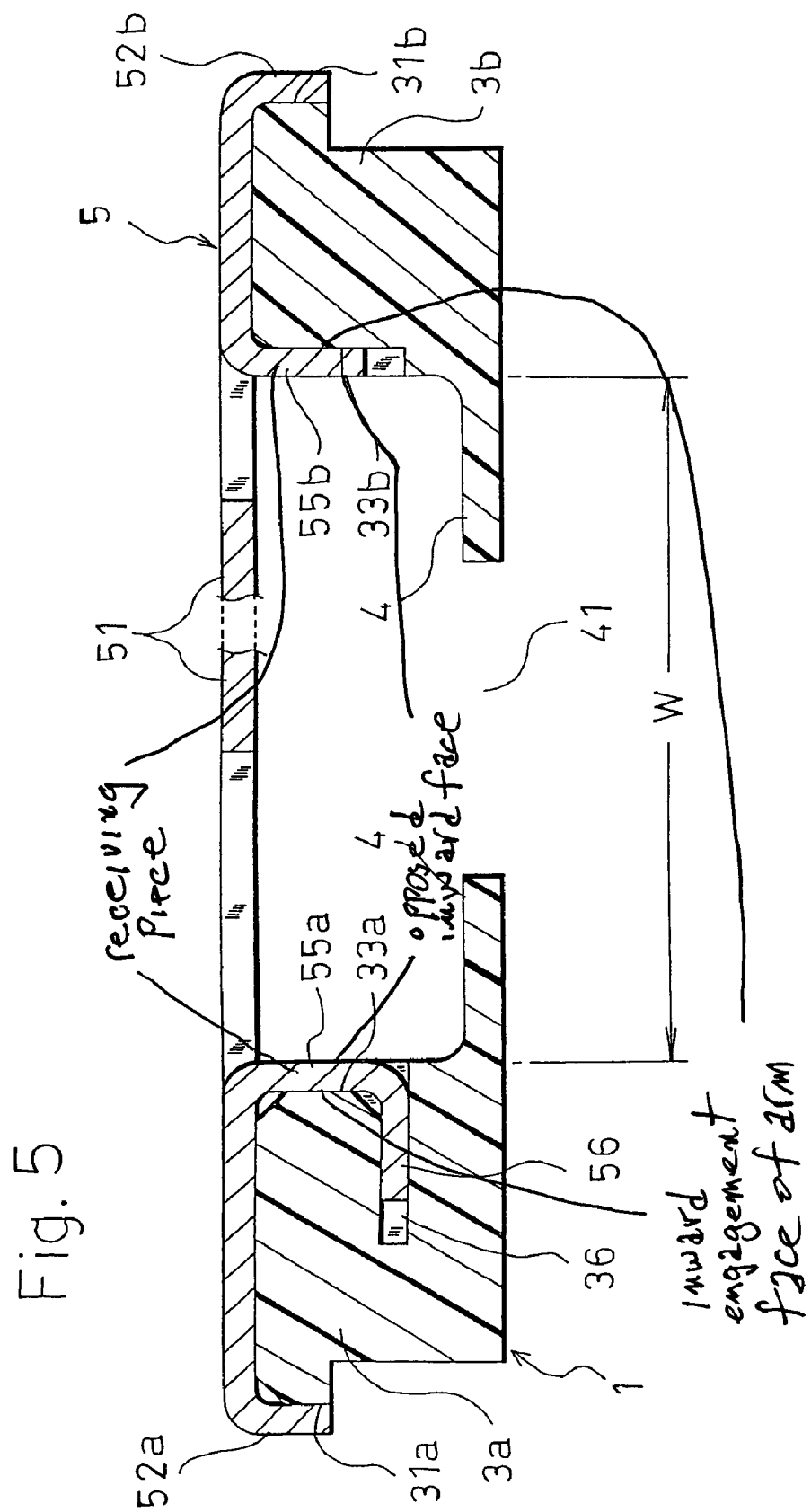
FIG. 5 is an enlarged section view of main portions, partially omitted.

FIG. 1 is an external perspective view of a card connector which is an embodiment of the invention, FIG. 2 is an external perspective view of a body 1, FIGS. 3 and 4 are enlarged perspective views showing different portions of the body 1, and FIG. 5 is an enlarged section view of main portions, partially omitted.

As shown in FIG. 2, the body 1 is made of an integral molded product of a synthetic resin, and a pair of arms 3a, 3b are extended from left and right ends of a laterally elongated head portion 2, respectively. A lower plate portion 4 is continuously integrated with the head portion 2 and the pair of arms 3a, 3b. A contact row 21 configured by a predetermined number contacts which are laterally arranged is incorporated into the head portion 2. The lower plate portion 4 has a recessed portion 41 which is between the pair of arms 3a, 3b, and which is recessed toward the head portion 2. In the recessed portion 41, right and left recessed edges 42a, 42b are formed into an arcuate shape. In the case where the recessed portion 41 is formed in the lower plate portion 4 in this way, even when the lower plate portion 4 is molded so as to have a reduced thickness, stress concentration hardly occurs in the recessed edges 42a, 42b because of the arcuate shapes of the recessed edges 42a, 42b, so that the lower plate portion 4 is hardly broken in the recessed edges 42a, 42b. The formation of the recessed portion 41 in the lower plate portion 4 is useful for suppressing the amount of a resin material for molding the body 1, and produces advantages such as that, when the body 1 is mounted on a circuit board or a chassis which is not shown, the mounting state can be easily stabilized. To one of the left and right arms 3a, 3b, or to the left arm 3a, attached are a lock spring 12 for locking a card (not shown) to an adequate set position, a spring member 13 for ejecting a card, and a cam mechanism 14 which performs a certain kind of operation. By contrast, components such as a card detection switch 15 for detecting insertion of a card are attached to the right arm 3b.

As shown in FIG. 1 or 5, a sheet metal frame 5 is attached to the body 1. The frame 5 has a face plate portion 51 which is extended from the head portion 2 of the body 1 to the foremost end portions 3a', 3b' of the arms 3a, 3b. Plate-like pieces 52a, 52b which are longitudinally extended, and which are formed by bending the left and right ends of the face plate portion 51 overlap outward faces 31a, 31b of the left and right arms 3a, 3b, respectively. The left and right plate-like pieces 52a, 52b exert functions of blocking outward deformations of the left and right arms 3a, 3b, and reinforcing the arms 3a, 3b. The body 1 and the frame 5 are coupled to each other so as not to rattle longitudinally and vertically, by engaging engagement holes 53 and engagement hooks 54 which are formed in plural front and rear positions of the plate-like pieces 52a, 52b of the frame 5, with engagement projections 32 and stepped faces (not shown in the figures) which are formed in corresponding positions of the arms 3a, 3b.

In a tip end portion of the frame 5, hook-like receiving pieces 55a, 55b are bendingly formed by vertically downwardly die-cutting and raising two or left and right places of the face plate portion 51, respectively. By contrast, as shown in FIG. 3 or 4, an inward engagement face 33a is formed in the foremost end portion 3a' of the left arm 3a, and an inward engagement face 33b is similarly formed in the foremost end portion 3b' of the right arm 3b. As shown in FIG. 5, the receiving pieces 55a, 55b of the frame 5 overlap the engagement faces 33a, 33b in a butting condition, respectively, to block inward displacements of the foremost end portions 3a', 3b' the left and right arms 3a, 3b. Since the foremost end portions 3a', 3b' of the left and right arms 3a, 3b are prevented by the left and right receiving pieces 55a, 55b of the frame 5 from being inwardly displaced in this way, the whole lengths of the arms 3a, 3b are not inwardly deflects. In the embodiment, an outward engagement piece 56 is extended from the left receiving piece 55a, and the engagement piece 56 is inserted into a channel 36 formed in the arm 3a. The configuration has an advantage that the tip end of the frame 5 is coupled with the foremost end portion of the arm 3a of the body 1 and hence the coupling force between the body 1 and the frame 5 is enhanced.

In the embodiment, as shown in FIG. 1 or 2, each of the left and right plate-like pieces 52a, 52b of the frame 5 is extended to reach the engagement face forming position a, b (see FIG. 3 or 4) of the foremost end portion of the corresponding one of the left and right arms 3a, 3b, and the engagement face forming position a, b is clamped between the plate-like piece 52a, 52b and the receiving piece 55a, 55b. In the case where the body 1 is produced by integral molding of a synthetic resin, even when the arms 3a, 3b of the molded body 1 are inwardly deflected for a technical reason in molding, therefore, the deflections of the arms 3a, 3b are adequately corrected by the clamping function exerted by the plate-like pieces 52a, 52b and the receiving pieces 55a, 55b.

In the embodiment, the pair of receiving pieces 55a, 55b are extended in the thickness direction T of a card C (see FIG. 1) which is to be inserted into a card insertion space formed by a space between the lower plate portion 4 of the body 1 and the face plate portion 51 of the frame 5, and, as shown in FIG. 5, the lateral width W of a insertion slot of the card insertion space is defined by the distance between opposing inward faces of the receiving pieces 55a, 55b. In the left and right arms 3a, 3b, guide faces 35a, 35b are formed in extended planes of the inward faces of the left and right receiving pieces 55a, 55b (see FIG. 1, 3, or 4), respectively.

In the thus configured card connector, when the card C is inserted as indicated by the arrow A in FIG. 1, the lateral position of the card C is restricted by the left and right receiving pieces 55a, 55b and the guide faces 35a, 35b, and the lateral width W of the insertion slot is maintained to the adequate dimension by the left and right receiving pieces 55a, 55b. Therefore, the card C can be inserted smoothly and in a proper posture. Even when a prying force is applied to the card C during a process of manually inserting the card C, the prying force is received not only by the left and right arms 3a, 3b, but also by the receiving pieces 55a, 55b and the plate-like pieces 52a, 52b. Even when the arms 3a, 3b are so thin and narrow that the arms 3a, 3b fail to have a considerably large strength, therefore, there arises no possibility that the arms 3a, 3b are deformed or broken. As a result, even when the card connector is narrowed and thinned by reducing the thickness and width of each of the arms 3a, 3b, the arms can be provided with sufficient strength.

What is claimed is:

1. A card connector comprising:
a body made of an integral molded product of a synthetic resin, said body including a head portion and a pair of arms which extend outwardly from said head portion, each arm of said pair of arms including a foremost end portion
a plurality of multipolar contacts; and
a sheet metal frame which extends between said pair of arms, and which cooperates with said body to form a card insertion space, wherein:
said sheet metal frame including arm support means for blocking inward deflections of said foremost end portions,
said arm support means is configured by a receiving piece which defines opposing inward faces and which butts against an inward engagement face that is provided in a foremost end portion of one of said arms,
said arm support means is extended in a thickness direction of a card C which is to be inserted into said card insertion space, and
a lateral width W of an insertion slot of said card insertion space is defined by a distance between said opposing inward faces of said receiving piece.

2. The card connector according to claim 1, wherein: said receiving piece is formed by bending said frame.

3. The card connector according to claim 1, wherein:
said arm support means is configured by a pair of receiving pieces which are to butt against inward engagement faces that are provided in said foremost end portions, respectively, and said receiving pieces are formed by bending said frame.

4. The card connector according to claim 1, wherein:
said body is provided with a lower plate portion which is continuously integrated with said head portion and said pair of arms, said card insertion space being formed between said lower plate portion and said frame,
a recessed portion that is recessed toward said head portion is formed in said lower plate portion and between said pair of arms, and right and left recessed edges of said recessed portion are formed into an arcuate shape.

5. The card connector according to claim 1, wherein:
plate-like pieces which overlap outward faces of said pair of arms to reinforce the arms respectively are formed by bending said frame.

6. The card connector according to claim 5, wherein:
said frame has a face plate portion which is extended from said head portion of said body to said foremost end portions of said arms, and
positions a, b of said foremost end portions of said arms where engagement faces are formed are clamped between said plate-like pieces and said arm supporting means, respectively.

7. The card connector according to claim 1, wherein:
the foremost end portion of one of said arms includes a channel, and
said receiving piece which butts against said inward engagement face includes an engagement piece that is received within said channel.

8. A card connector comprising:
a body made of an integral molded product of a synthetic resin, said body including a head portion and a pair of arms which extend outwardly from said head portion, each arm of said pair of arms including a foremost end portion;
a plurality of multipolar contacts mounted to said body; and
a sheet metal frame which extends between said pair of arms, and which cooperates with said body to form a card insertion space, wherein:
said sheet metal frame including arm support means for blocking inward deflections of said foremost end portions of said arms, at least one of which said arm supporting means including an engagement piece extending therefrom which aids in further securing its associated foremost end portion and consequently said body to said sheet metal frame,
said arm support means is extended in a thickness direction of a card C which is to be inserted into said card insertion space, and
a lateral width W of an insertion slot of said card insertion space is defined by a distance between opposing inward faces of said arm support means.

* * * * *